(12) United States Patent
Shinohara et al.

(10) Patent No.: US 6,802,920 B2
(45) Date of Patent: Oct. 12, 2004

(54) ULTRASONIC WAVE SEALING METHOD FOR CONTAINER

(75) Inventors: Mitsuhiko Shinohara, Tokushima (JP);
Michio Ueda, Tokushima (JP)

(73) Assignee: Shikoku Kakoki Co., Ltd., Itano-gun (JP)

( * ) Notice: Subject to any disclaimer, the term of this patent is extended or adjusted under 35 U.S.C. 154(b) by 0 days.

(21) Appl. No.: 10/469,549

(22) PCT Filed: Mar. 11, 2002

(86) PCT No.: PCT/JP02/02225

§ 371 (c)(1),
(2), (4) Date: Sep. 10, 2003

(87) PCT Pub. No.: WO02/072426

PCT Pub. Date: Sep. 19, 2002

(65) Prior Publication Data

US 2004/0094255 A1 May 20, 2004

(30) Foreign Application Priority Data

Mar. 12, 2001 (JP) .......................... 2001-68275

(51) Int. Cl.$^7$ .............................................. B29C 65/08
(52) U.S. Cl. ..................... 156/73.1; 156/69; 156/580.2; 53/485; 53/DIG. 2
(58) Field of Search ........................ 156/69, 73.1, 290, 156/292, 308.2, 308.4, 580.1, 580.2; 53/485, 329, 329.2, DIG. 2; 425/174.2; 228/1.1, 110.1

(56) References Cited

U.S. PATENT DOCUMENTS

| 3,254,402 | A | | 6/1966 | Balamuth et al. |
| 3,438,824 | A | * | 4/1969 | Balamuth ..................... 156/69 |
| 5,152,438 | A | * | 10/1992 | Gordon et al. ............... 222/546 |
| 5,562,790 | A | * | 10/1996 | Ehlert et al. ................ 156/73.1 |
| 5,830,300 | A | | 11/1998 | Suzuki et al. |
| 6,613,171 | B2 | * | 9/2003 | McNichols et al. ......... 156/73.1 |

FOREIGN PATENT DOCUMENTS

| FR | 2736617 A1 | 1/1997 |
| GB | 998124 A | 7/1965 |

* cited by examiner

Primary Examiner—James Sells
(74) Attorney, Agent, or Firm—Armstrong, Kratz, Quintos, Hanson & Brooks, LLP (57) ABSTRACT

An ultrasonic container sealing method of sealing a closure 12 to a container main body 11 with use of an ultrasonic horn 54 having a sealing action face 53 comprises applying pressure to a lap of an outer peripheral portion of the closure 12 and a flange 24 of the container main body 11 as lapped over each other by the sealing action face 53, and causing ultrasonic rotational vibration in a rotating direction about an axis parallel to the direction of application of the pressure to act on the sealing action face 53.

5 Claims, 7 Drawing Sheets

Fig.9

ULTRASONIC WAVE SEALING METHOD FOR CONTAINER

TECHNICAL FIELD

The present invention relates to a method of ultrasonically sealing containers with use of an ultrasonic sealing device for sealing a closure, spout plug or other container component to the main body of the container.

BACKGROUND ART

Such an ultrasonic sealing method for containers uses an ultrasonic horn having a sealing action face for sealing a container component to the main body of the container. The sealing action face applies pressure to the portions to be sealed of the container component and the container main body as lapped over each other, and ultrasonic reciprocating vibrations in an axial direction parallel to the direction of application of the pressure are caused to act on the sealing action face.

Also known are other sealing methods which use no ultrasonic sealing device, such as high-frequency induction sealing, high-frequency dielectric sealing and heat sealing with use of a heat plate.

The ultrasonic reciprocating vibrations applied to the horn act on the portions of the container to be sealed as if beating, are therefore transmitted to the wall of the container or to a head space inside the container, and vibrate the contents of the container. This entails the likelihood that the contents will be broken, or the contents will be forced out of the container during sealing by being shaken vigorously or becoming vaporized depending on the conditions involved, if the contents are liquid. To preclude these phenomena, the container needs to have an increased head space.

Furthermore, the conditions for producing satisfactory seals are greatly limited; unless the conditions are fulfilled, a thin wall portion of component of the container will be broken, or pinholes are likely to develop in the seal joint.

In the case where axial ultrasonic reciprocating vibrations are caused to act on the sealing action face for sealing, the sealing operation requires a great pressure. The sealing method is therefore unsuited to containers which are low in buckling strength. In addition, the great pressure must to be received in the vicinity of the portions to be sealed. For this reason, there arises a need to provide a pressure receiving flange on an opening-defining edge portion of the container main body, or an attempt is made to cover the edge portion with a skirted caplike closure. However, when the pressure is to be received by the flange, the skirt becomes an obstacle and can not be formed on the cap, hence limitations on the design of the container and the cap.

Since ultrasonic sealing can not be resorted to for sealing containers of small strength or skirted closures, high-frequency induction sealing or high-frequency dielectric sealing is used, whereas the use of high-frequency sealing requires the use of aluminum or like material which induces high-frequency waves for the portions to be sealed, or the high-frequency dielectric sealing necessitates a material amenable to this method of sealing, hence limitations on the materials for the container or closure and problems to be involved in recycling the material.

The heat sealing operation requires time, is inefficient, and is infeasible for containers and closures having a large thickness.

An object of the present invention is to overcome all the above problems and to provide a method of ultrasonically sealing containers which will not adversely affect the contents of the container during sealing and which can be practiced under widely varying conditions with a high efficiency.

DISCLOSURE OF THE INVENTION

In sealing a container component to a container main body using an ultrasonic horn having a sealing action face, the present invention provides an ultrasonic container sealing method comprising applying pressure to portions to be sealed of the container component and the container main body as lapped over each other by the sealing action face and causing ultrasonic rotational vibration in a rotating direction about an axis parallel to the direction of application of the pressure to act on the sealing action face.

With the ultrasonic container sealing method of the invention, the ultrasonic rotational vibration to be caused to act on the sealing action face does not act as if beating the wall of the container but acts in a direction along the container wall. Accordingly, the vibration produces no adverse effect on the contents during sealing. Furthermore, the pressure to be applied can be small. Moreover, advantages are also available such as a reduction in the wall thickness of containers, savings in resources and cost reductions. The materials for the container body and container components are not limited. For this reason, the container main body and closure can be produced from aluminum-free materials, hence ease of recycling.

When ultrasonic vibration other than the ultrasonic rotational vibration is caused to act on the sealing action face in combination with the rotational vibration, an efficient sealing operation can be performed by utilizing the combined vibrations of ultrasonic waves.

If the sealing action face is provided with indentations and projections in advance for improving the sealing conditions, the sealing operation can be conducted under widely varying conditions.

The container main body may be provided around an edge portion thereof defining an opening with a flange forming the portion to be sealed, and the container component may be in the form of a cap to be fitted over the opening-defining edge portion of the container main body and having a skirt at an outer peripheral edge portion providing the portion to be sealed.

When the pressure to be applied by the ultrasonic horn is received by a bottom of the container main body, the container becomes easy to handle for sealing.

BEST MODE OF CARRYING OUT THE INVENTION

Embodiments of the invention will be described below with reference to the drawings.

Figure 1:
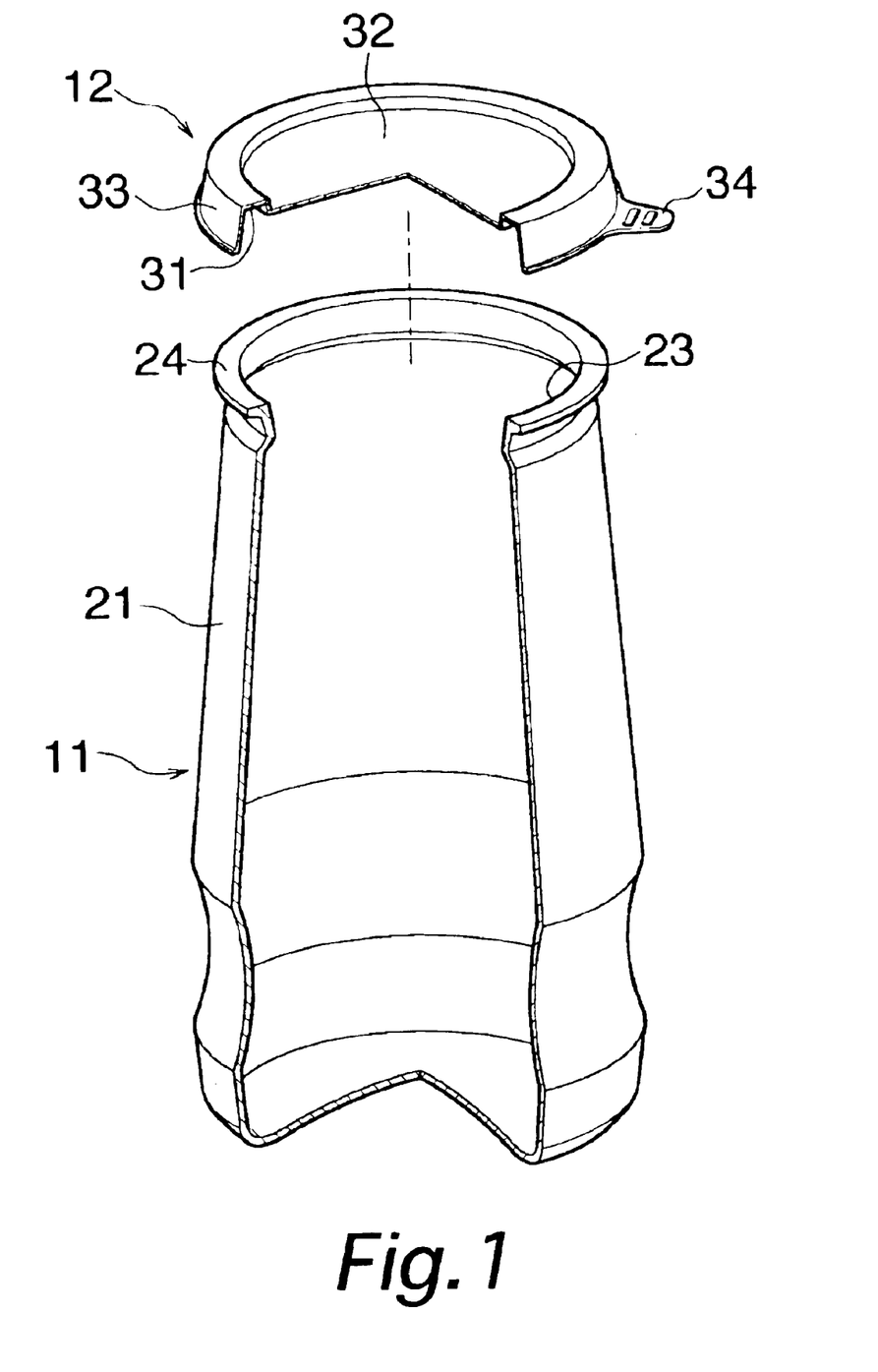
FIG. 1 is an exploded perspective view of a container main body and a closure which are joined by the sealing method of the invention.

FIG. 1 shows a container comprising a main body 11 and a closure 12. The container main body 11 and the closure 12 are molded from the same kind of thermoplastic synthetic resin. Examples of useful thermoplastic resins are PS, PP, PE, PET, PEN, etc. or a composite material of such resins.

The container main body 11 is in the form of a bottle and has a tubular trunk 21 having a bottom. The trunk 21 has an opening 23 defined by an edge provided with a flange 24.

The closure 12, which is in the form of a cap of small height, comprises an annular fitting recessed portion 31 in the form of a channel and facing downward, a flat platelike web portion 32 integral with the lower end of inner side wall of the recessed portion 31, a skirt 33 extending downward from the outer side wall of the recessed portion 31, and a knob 34 integral with a part of lower end of outer periphery of the skirt 33.

The fitting recessed portion 31 is fitted over the flange 24, and the bottom wall of the recessed portion 31 is lapped over and sealed ultrasonically to the top wall of the flange 24.

Figure 2:
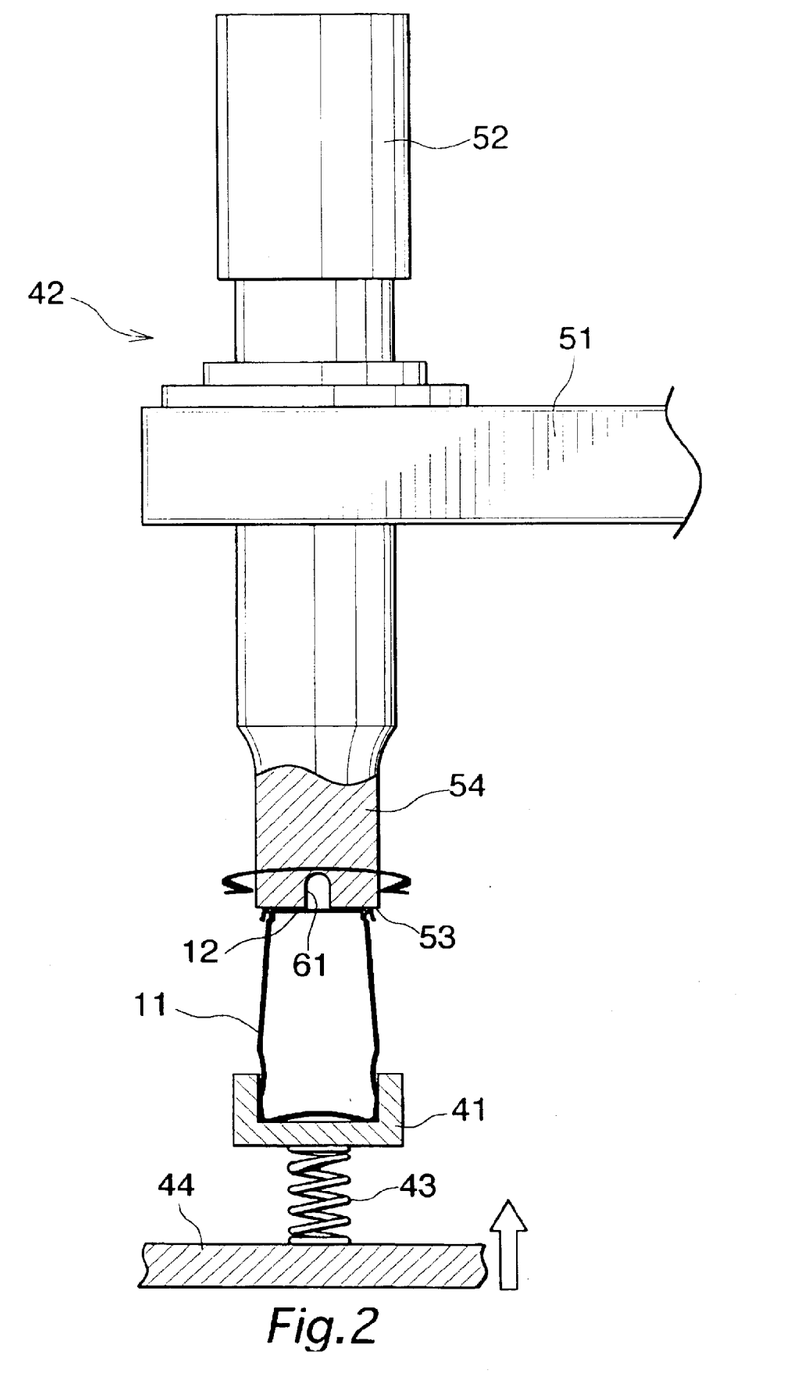
FIG. 2 is a diagram for illustrating how to seal a container by a sealing device for practicing the method of the invention.

FIG. 2 shows a container holder 41, and an ultrasonic sealing device 42 disposed above the container holder 41 and facing vertically downward.

The container holder 41 is supported by a compression coil spring 43 on a horizontal lift plate 44. The sealing device 42 comprises a device body 52 mounted on a support 51, and a horn 54 in the form of a round rod, projecting downward from the device body 52 and provided at the lower end thereof with a sealing action face 53 facing downward. An unillustrated vibrating element is incorporated in the device body 52. The vibrating element causes ultrasonic rotational vibrations to act on the sealing action face 53 of the horn 54 in a rotating direction about the axis thereof as indicated by an arrow in FIG. 2.

Figure 3:
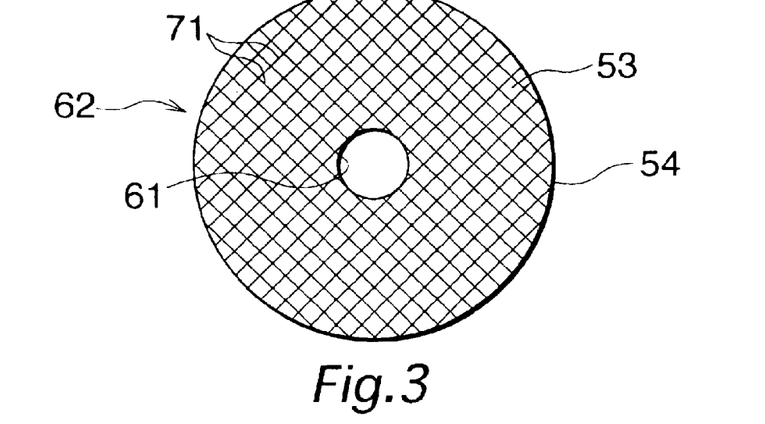
FIG. 3 is an enlarged view showing a sealing action face at the forward end of a horn of the sealing device.
Figure 4:
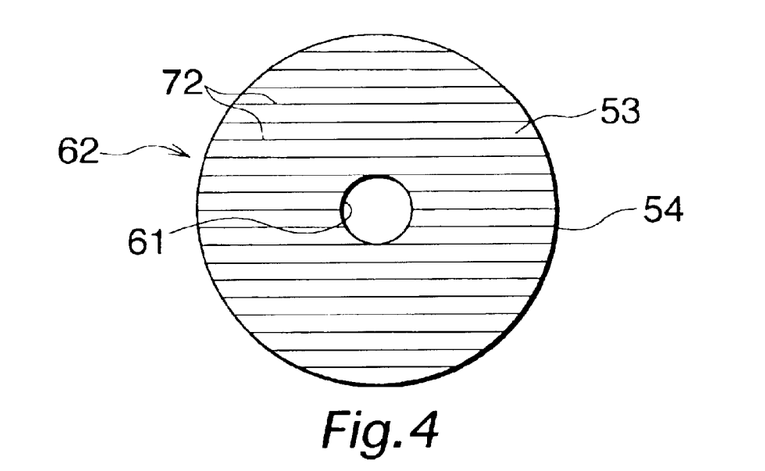
FIG. 4 is an enlarge view corresponding to FIG. 3 and showing another example of sealing action face of the device.
Figure 5:
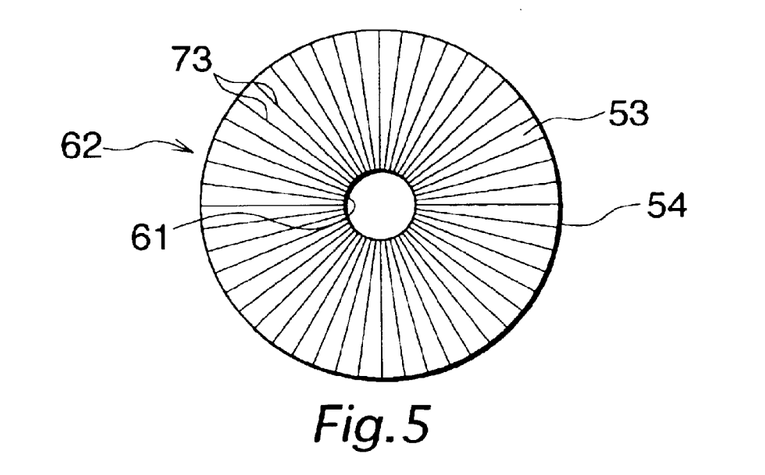
FIG. 5 is an enlarge view corresponding to FIG. 3 and showing another example of sealing action face of the device.

The sealing action face 53 has a cavity 61 formed centrally thereof, and indentations and projections 62 formed around the cavity 61. Examples of indentations and projections 62 are those provided by forming in the sealing action face 53 intersecting grooves 71 extending in two directions as shown in FIG. 3, those provided by forming in the sealing action face 53 parallel grooves 72 extending in one direction as seen in FIG. 4, and those provided by forming in the sealing action face 53 radial grooves 73 extending radially of the face as shown in FIG. 5.

Improved sealing conditions are available by providing such indentations and projections 62. The sealing conditions are, for example, the amplitude of ultrasonic waves, vibrating time, the pressure to be applied during sealing, the period of time during which the pressure is to be maintained, etc. These conditions can be set over wide ranges.

When the spring 43 is compressed by raising the lift plate 44, with the bottom of the container main body 11 supported by the container holder 41, the force of the spring causes the sealing action face 53 to apply pressure to the recessed portion 31 and the flange 24. When the vibrating element applies ultrasonic rotational vibrations to the horn 54, the bottom wall of the recessed portion 31 is sealed to the top wall of the flange 24.

The pressing means may be one other than the spring. For example, a fluid pressure cylinder may be provided on the horn side.

Containers having shapes different from that of the one described above will be sealed in the modified modes to be described below.

Figure 6:
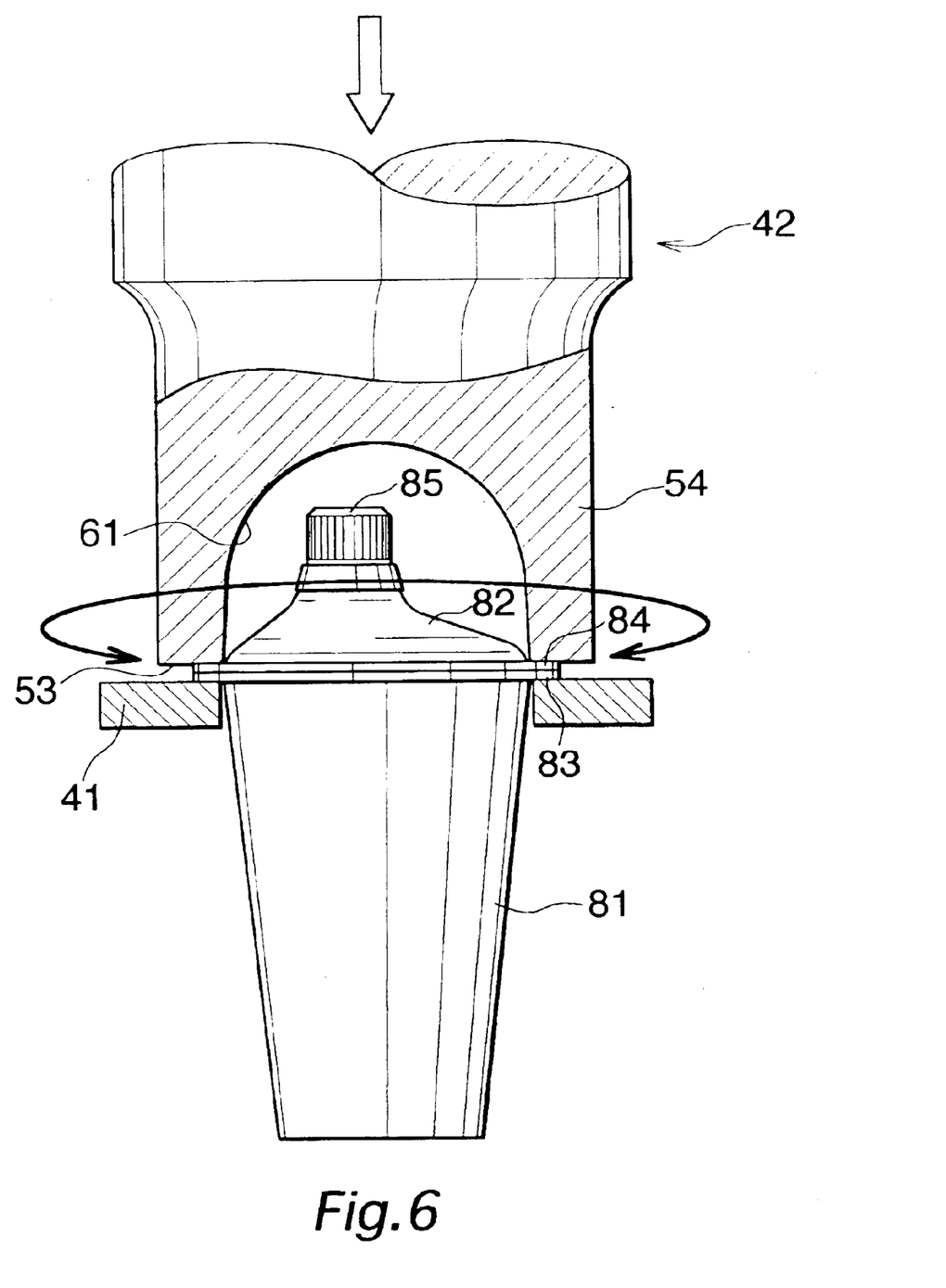
FIG. 6 is a diagram for illustrating other mode of sealing a container.

FIG. 6 shows a container comprising a cuplike main body 81 and a closure 82 in the form of a dome. The container main body 81 has a flange 83 around an edge portion defining an opening. The closure 82 has a lower edge provided with a flange 84, which is lapped over the flange 83 of the main body 81. The closure 82 is provided at its top with a spout (not shown), and a cap 85 is fitted over the spout.

The container main body 81 is fitted into a container holding hole of a container holder 41 and has its flange 83 supported by an edge portion of upper surface of a container holder 41 which portion defines the container holding hole.

A sealing action face 53 has a cavity 61 which is so sized as to accommodate the closure 82 nearly in its entirety. An inner edge portion of the face 53 defining the cavity 61 applies pressure to both the flanges 83, 84 of the container main body 81 and the closure 82, and ultrasonic rotational vibrations are caused to act on the horn 54 in this state.

In this case, the pressure for sealing is applied by pressing means provided on the ultrasonic sealing device 42, for example, by an unillustrated fluid pressure cylinder.

Figure 7:
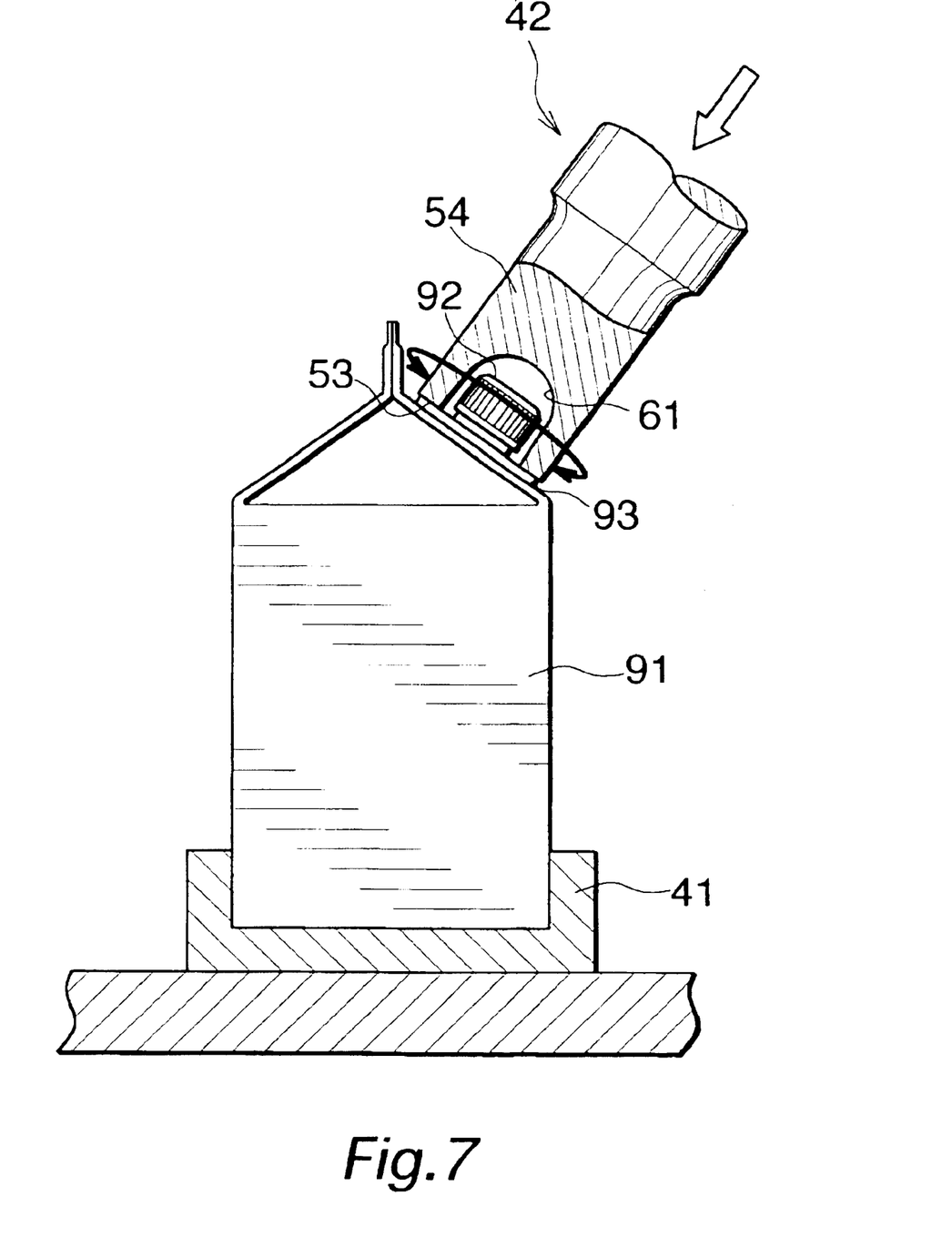
FIG. 7 is a diagram for illustrating other mode of sealing a container.

FIG. 7 shows a case wherein the lower surface of a flange 93 of a plug 92 having a cap is sealed to the outer surface of edge portion of a spout (not shown) which is provided on a top portion of the main body 91 of a container having a gable top.

The container main body 91 is supported at its bottom by a container holder 41 which is fixedly supported.

Figure 8:
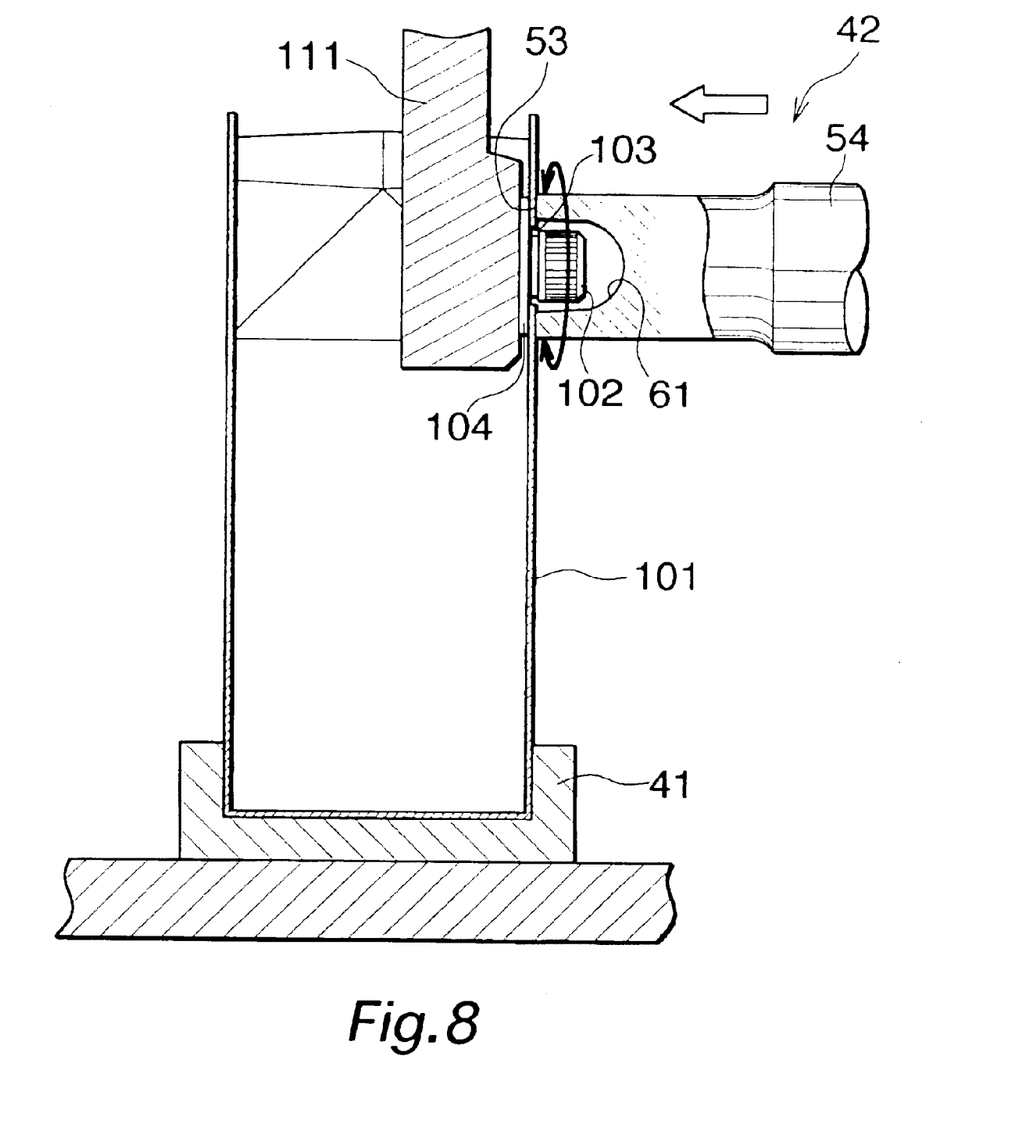
FIG. 8 is a diagram for illustrating other mode of sealing a container.

FIG. 8 shows a case wherein a plug 102 is attached to a top portion of a container main body 101 having a gable top before the top portion is closed. The plug 102 is fitted into a spout 103 from inside the container main body 101, with a flange 104 of the plug bearing on the inner surface of an edge portion of the spout 103.

The flange 104 and the edge portion of the spout 103 are clamped between a horn 54 of an ultrasonic sealing device 42 and an anvil 111, and thereby subjected to pressure. Ultrasonic waves are produced in this state.

The ultrasonic sealing device 42 is provided with pressing means for applying pressure in this case as in the case shown in FIG. 6.

Figure 9:
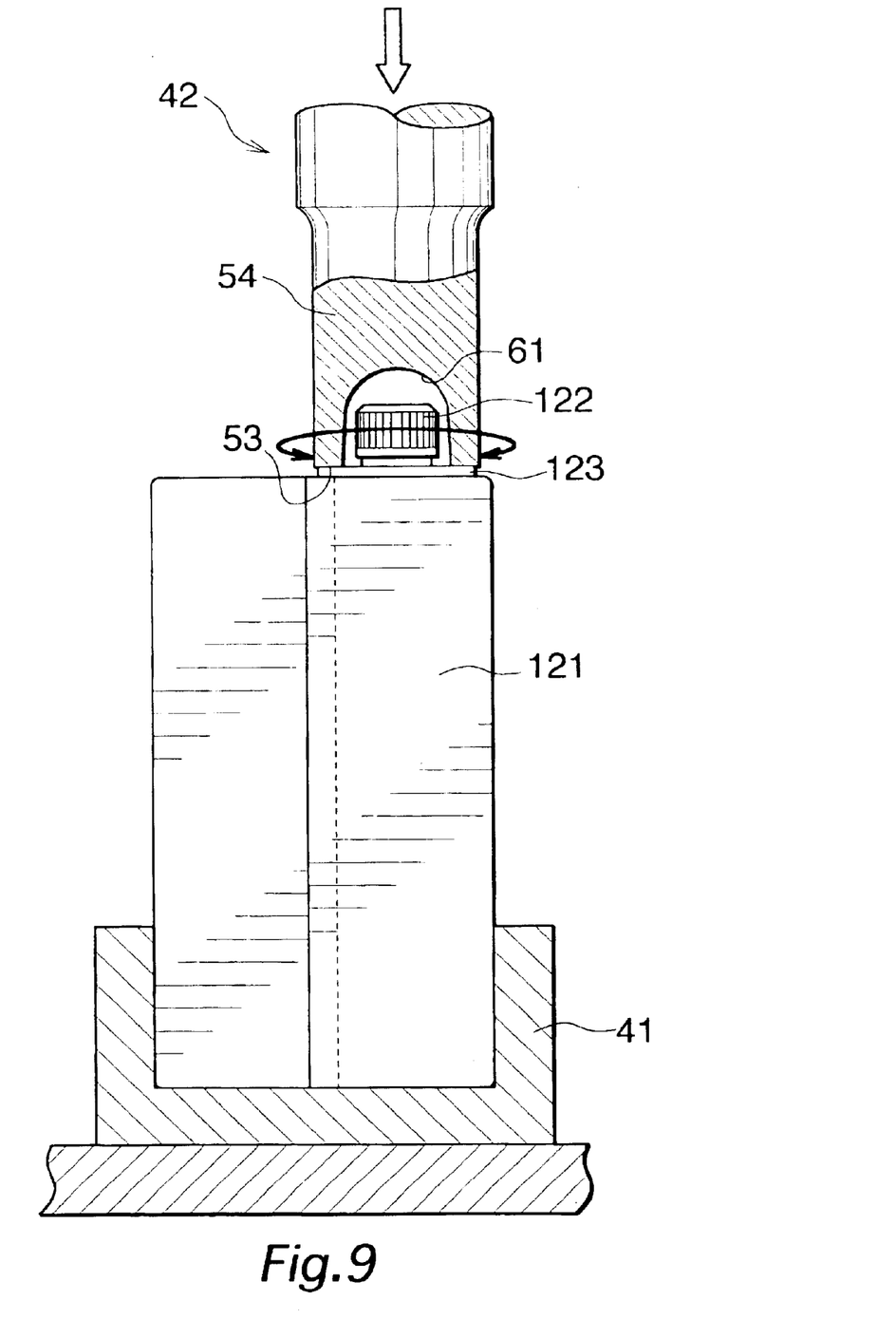
FIG. 9 is a diagram for illustrating other mode of sealing a container.

FIG. 9 shows a case wherein a plug 122 is sealed to a top portion of a bricklike container main body 121. The container main body 121 and a plug flange 123 are held between the horn 54 of a ultrasonic sealing device 42 and a container holder 41 from above and below.

In any of the above cases, ultrasonic rotational vibrations are applied to the portions to be sealed. Already known as ultrasonic vibrations are ultrasonic reciprocating vertical vibrations parallel to the axial direction of the horn, ultrasonic reciprocating horizontal vibrations orthogonal to the axial direction of the horn, and oblique vibrations comprising vertical vibrations and horizontal vibrations in combination. Depending on the material of the container on which the sealing conditions are dependent, it is effective to use combined vibrations comprising ultrasonic rotational vibrations and other ultrasonic vibrations including the above ultrasonic vibrations.

INDUSTRIAL APPLICABILITY

The ultrasonic container sealing method of the invention is suitable for sealing, for example, a closure, plug or other container component to a container main body with use of an ultrasonic sealing device.

What is claimed is:

1. In sealing a container component to a container main body using an ultrasonic horn having a sealing action face, an ultrasonic container sealing method comprising applying pressure to portions to be sealed of the container component and the container main body as lapped over each other by the sealing action face and causing ultrasonic rotational vibration in a rotating direction about an axis parallel to the direction of application of the pressure to act on the sealing action face.

2. An ultrasonic container sealing method according to claim 1 wherein ultrasonic vibration other than the ultrasonic rotational vibration is caused to act on the sealing action face in combination with the rotational vibration.

3. An ultrasonic container sealing method according to claim 1 or 2 wherein the sealing action face is provided with indentations and projections in advance for improving the sealing conditions.

4. An ultrasonic container sealing method according to claim 1 or 2 wherein the container main body is provided around an edge portion thereof defining an opening with a flange forming the portion to be sealed, and the container component is in the form of a cap to be fitted over the opening-defining edge portion of the container main body and having a skirt at an outer peripheral edge portion providing the portion to be sealed.

5. An ultrasonic container sealing method according to claim 1 or 2 wherein the pressure to be applied by the ultrasonic horn is received by a bottom of the container main body.

* * * * *